Sept. 26, 1950      F. W. RIEHL      2,523,332
RADIANT HEAT DEVICE AND METHOD
Filed June 14, 1945      3 Sheets-Sheet 1
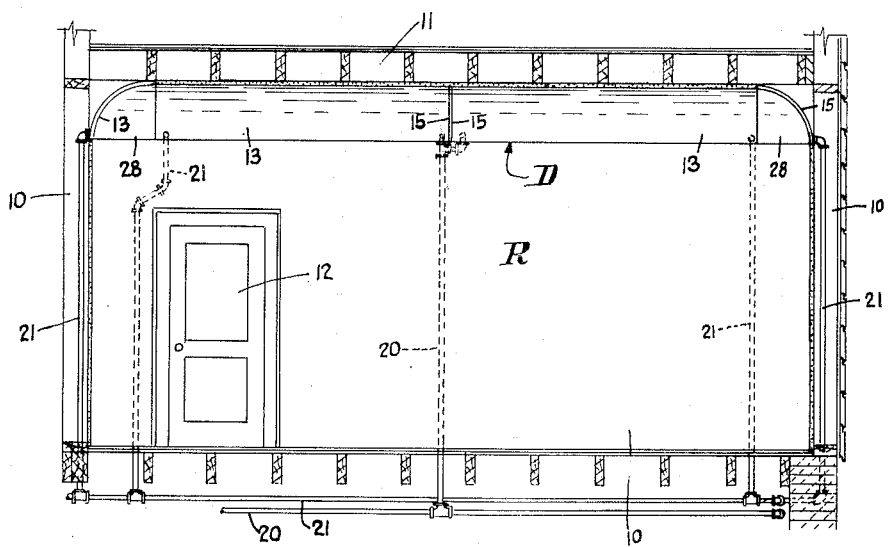
Fig. 1
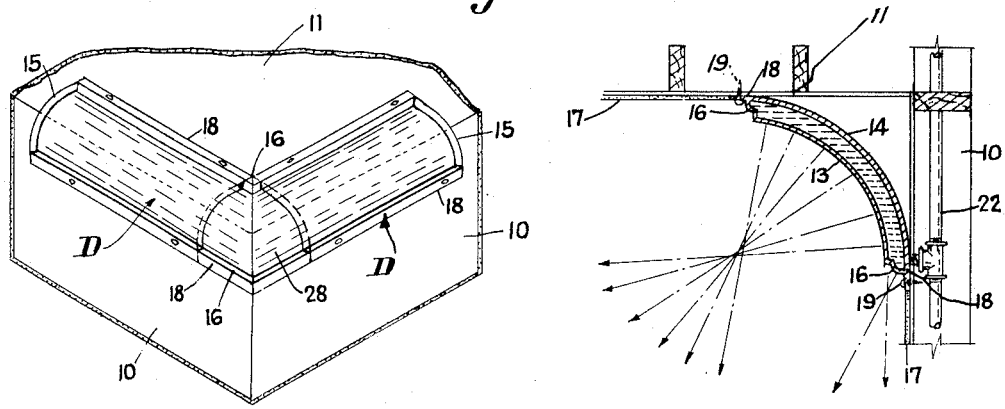
Fig. 2
Fig. 3
FREDERICK W. RIEHL
INVENTOR.
BY
*W. A. McGrew*
ATTORNEY

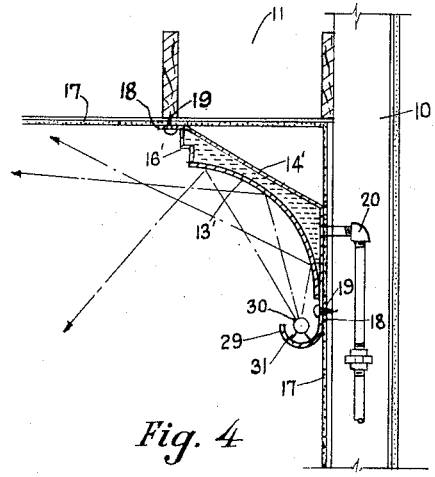
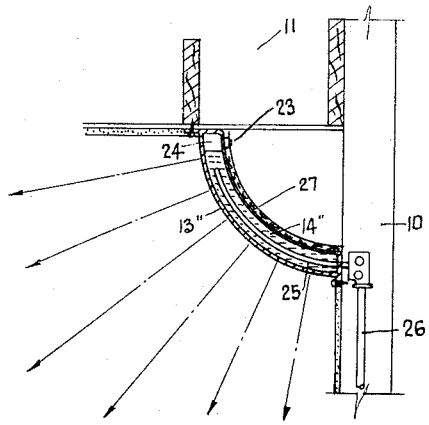
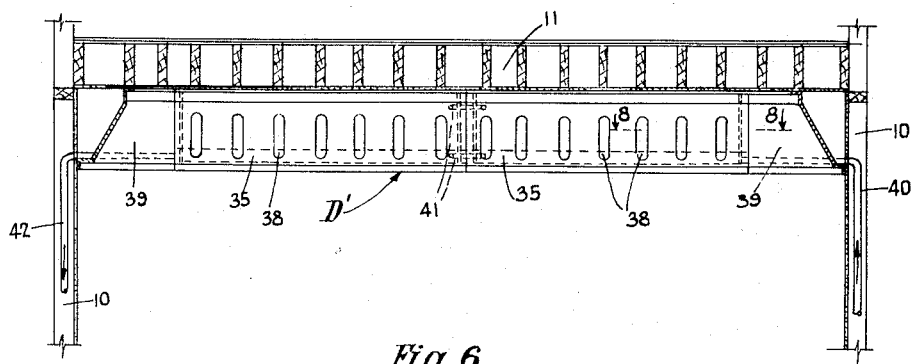
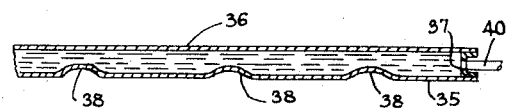
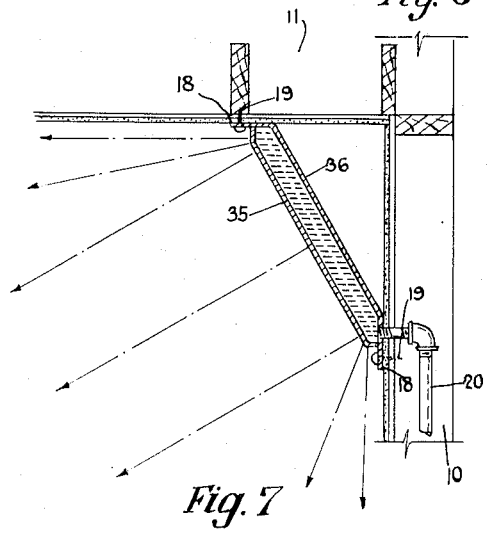

Sept. 26, 1950　　　　　F. W. RIEHL　　　　　2,523,332
RADIANT HEAT DEVICE AND METHOD
Filed June 14, 1945　　　　　　　　　　　　3 Sheets-Sheet 3

FREDERICK W. RIEHL
INVENTOR.

BY

*ATTORNEY*

Patented Sept. 26, 1950

2,523,332

UNITED STATES PATENT OFFICE 2,523,332

RADIANT HEAT DEVICE AND METHOD

Frederick W. Riehl, Denver, Colo.

Application June 14, 1945, Serial No. 599,487

11 Claims. (Cl. 219—38)

This invention relates to radiant heat devices and methods, and more particularly to the heating and cooling of enclosed spaces, such as rooms or the like.

Devices and methods previously used in this country for heating rooms and the like have embodied convection and conduction principles, such devices including radiators or pipes supplied with steam or hot water, or registers supplied with hot air. These devices have normally been installed on or near the floor of the room, since such a position contributes to the effectiveness of heat transfer, as heated air naturally rises upwardly and heat is therefore introduced as close to the floor as possible to achieve maximum circulation and a maximum amount of heat transfer to the body of air in the room. Such devices usually have a complicated shape, thereby producing numerous crevices in which dust tends to collect and which are difficult to clean, are relatively displeasing in appearance to the average person, and take up wall space which is thereby rendered useless for any other purpose.

The circulation of air currents into and through a room, whether induced by radiators or produced by hot air registers, keeps dust stirred up, circulates and distributes germs, and tends to maintain unhealthy drafts. Due to the necessity of providing for a sufficient transfer of heat to each occupant, principally by conduction, to compensate for the normal heat loss of such occupant through radiation and conduction, the temperature at which the air in a room so heated must be maintained for comfort of the occupants is usually unduly high. Such temperature is often so high as to induce drowsiness and sleepiness, thereby reducing the effectiveness of study or other activities, principally mental, carried on while the body remains relatively quiescent.

By supplying the principal amount of heat in the form of radiant heat rays or energy, comfort may be assured and the temperature of a room may be maintained lower, in some instances from 5° to 10° F. lower, than in heating by conduction and convection. Since radiant heat rays will travel through the air without substantial loss, and since little heat is transferred until the radiant heat rays strike either an occupant or an object, such as furniture, in the room, each occupant can receive immediate benefit from all the radiant heat rays impinging thereon, and the normal heat loss of an occupant can be substantially compensated, irrespective of the actual room temperature. Thus, equivalent amounts of heat energy can be supplied without unduly raising the temperature of a room, and at the same time full comfort provided. A further result of heating by radiant energy, despite the lower temperature of the air in a room, is the higher temperature of objects, such as furniture, which absorb radiant heat rays impinging thereon, and are thereby heated to a higher temperature and become more comfortable to the touch.

A fireplace is, of course, an ancient and elementary device for heating a room by radiant energy, but the defects of fireplaces are so well known as to require no further explanation. Conventional radiators, for heating by conduction and convection, discharge a certain amount of radiant heat rays, but the position of such radiators is such that radiant heat is never distributed to substantially all parts of a room, and such radiant heat is too often intercepted by objects of furniture or the like in the room. Thus, little radiant heat reaches the occupants of the room.

There have been numerous attempts to utilize the principles of radiant heating, principally abroad, but the devices have primarily been merely substitutes, in position and construction, for the previous radiators or hot air registers. Thus, the greatest effectiveness and results from heating by radiant energy have not been achieved.

Among the objects of this invention are to provide a novel radiant heat device and method; to provide such a device which is adapted to be installed in a position in which convection losses are a minimum, and which will cause a minimum of convection currents and a minimum circulation of dust and germs; to provide such a device which is adapted to be so positioned as to direct radiant heat toward occupants of a room, with a minimum of obstruction of such radiant heat by articles of furniture, or the like, and which will so distribute radiant heat that an occupant will not feel substantially different in one part of the room than another; to provide such a device which is free of dust crevices, is easy to clean and tends to stay clean, and is pleasing in appearance; to provide such a device which will direct radiant heat rays from substantially all sides to each portion of a room; to provide such a device which is shaped so as to distribute radiant heat rays over substantially the entire area of a room; to provide such a device which will discharge heat rays tending to reach each portion of a room in substantially uniform quantity over all portions; to provide such a device which will reduce the amount of radiating surface necessary for effective heating; to provide such a device particularly adapted to be installed in either a room being constructed, or a room already constructed; to provide such a device adapted to be used for cooling a room, if so desired; to provide one form of such device to which hot water or steam can be supplied as a heating medium; to provide another form of such device to which electricity can be supplied as a heating medium; to provide still another form of such device to which heated air can be supplied as a heating medium; to provide a modification of any of the previous forms which will also distribute light rays through an indirect lighting effect; to provide a radiant heat device made up of sections adapted to extend entirely around a room, and which may be utilized in effectively heating a room, irrespective of the size and shape of the room; and to provide novel methods particularly adapted to be carried out by devices adapted to attain the foregoing objects, and which may be economically and efficiently carried out.

Other objects and the novel features of this invention will become apparent from the following description.

In accordance with this invention, an enclosure such as a room is heated by directing radiant heat from a surface or surfaces in the upper portion of the room, preferably adjacent the ceiling, each such surface being shaped to direct radiant heat towards all portions of the room, and the surfaces being adapted to distribute heat about the lower portion of the room, preferably uniformly and substantially from all four sides to each portion of the room. Such surface may be inclined outwardly from the side walls of the room, adjacent the ceiling, and may be concave, convex, or angular. Also, light rays may be directed from the same surface, a shielded source of light preferably being disposed below the surface for this purpose.

Additional features of the above method will become further apparent from heating devices adapted to carry out such method, as illustrated in the accompanying drawings, in which:

Fig. 1 is a cross section of a room provided with a curved radiant heat device comprising one embodiment of this invention to which hot water or steam may be supplied as a heating medium;

Fig. 2 is a fragmentary isometric view looking upwardly toward one corner of the room of Fig. 1;

Fig. 3 is an enlarged cross section of the installation of a concave radiant heat device, one form of the device of Fig. 1;

Fig. 4 is a cross section of the installation of a radiant heat device adapted also to provide light for the room;

Fig. 5 is a cross section of the installation of a convex radiant heat device, another form of the device of Fig. 1 and to which electricity may be supplied as a heating medium;

Fig. 6 is a lateral vertical section of the upper portion of a room, illustrating the installation of an angular radiant heat device having two sections in series and comprising a second embodiment of this invention;

Fig. 7 is an enlarged cross section of the heating device of Fig. 6, illustrating more clearly the angular or sloping sides thereof;

Fig. 8 is an enlarged longitudinal section taken along line 8—8 of Fig. 6;

Figure 9:
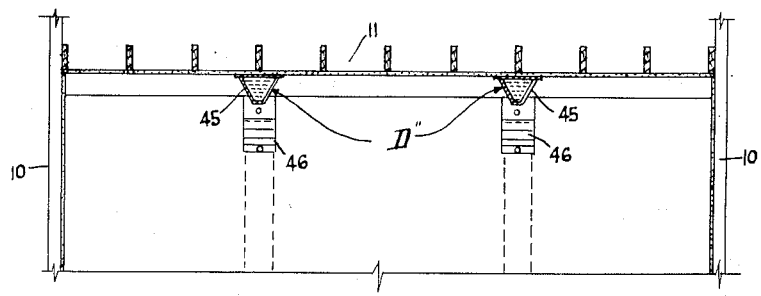
Fig. 9 is a lateral vertical section of the upper portion of a room, illustrating the installation of still another embodiment of this invention, heat devices simulating supporting beams, or the like, to which hot air or hot water may be supplied as a heating medium.

As illustrated generally in Figs. 1 to 3, inclusive, radiant heat device D, constructed in accordance with this invention, is adapted to be installed around the upper corners of a room R, as closely adjacent as practical to the intersection of the side walls 10 and the ceiling 11 of the room. The device D is disposed well above all openings, such as a door 12, a window, or the like, as well as objects such as furniture. This increases the available wall space, thus increasing the occupable area of the room. A heating medium such as hot water, steam, hot air, electricity, or the like, is supplied to the device D, or a cooling medium may be circulated through the same for cooling the room, if desired.

The radiant heat device D, because of its position in the room, is highly efficient and beneficial. Since the temperature of the air in a room is normally highest adjacent the ceiling, because of the lower specific gravity and rise of hot air toward the ceiling, the temperature differential between the heat device D and the surrounding air will not be great. The device D is operating in contact with air more nearly the temperature of the radiating surface thereof, so that the heat loss by conduction and to convection currents is a minimum, with a resultant efficiency. Furthermore, convection currents are reduced to a minimum, thereby minimizing the circulation of dust particles, microbes, and the like, so common in rooms heated in the ordinary manner. Radiant heat devices of this invention are ideal for heating bedrooms, to maintain a relatively low temperature therein for sound slumber yet keep the body temperature of occupants at a comfortable level.

The device D preferably comprises one or more sections, each having a side 13 facing the room, a side 14 away from the room, and ends 15, which are formed of suitable material, such as metal, plastic, or the like, and are welded or otherwise joined together to form an enclosure adapted to receive the heating medium. Ends 15 may be formed by one or more of the sides bent over, or by separate pieces interposed between the sides and joined thereto. Or, the ends may be tapered, formed by one or both sides bent into contact with each other, and attached together. It will also be evident that any of the sides, ends, tops and bottoms may be made of a plurality of pieces joined together, or the entire device may be a single piece, such as a casting.

The exterior surface of the side facing the room directs radiant heat into the room, and such surface or side of the device D is curved so as to direct radiant heat from each wall over substantially the entire room. By placing sections around substantially the entire room, each portion of the room receives radiant heat from all four directions, thus insuring adequate heating of all occupants. The curvature of the radiating surface or side may be varied as conditions indicate. Thus, in Figs. 2 and 3, side 13 is generally concave, to direct radiant heat along the lines indicated. Side 13' of Fig. 4 is similarly concave, while side 13″ of Fig. 5 is convex, to direct radiant heat waves along the lines indicated. If desired, an ornamental effect, such as provided by moulding 16 of Figs. 2 and 3, or moulding 16′ of Fig. 4, may be provided, partially for esthetic purposes, and also to space the radiating surfaces slightly from the walls and/or ceiling. As will be evident from Figs. 3 and 5, the radiant heat rays are discharged to reach not only the floor beneath the device, but also sufficiently high up on the opposite wall of the room to provide comfort for a person standing. The radiant heat rays directed toward the occupants from near the ceiling will tend to clear objects in the room, such as furniture, thereby reaching all occupants, irrespective of place in the room or position, such as standing, sitting, or lying down. Also, the radiant heat rays will impinge upon the windows and frames in the opposite wall of the room, thus counteracting the tendency toward cold air currents falling to the floor.

The opposite side 14, as in Fig. 3, may have substantially the same shape as side 13, being disposed substantially parallel to the same, and the opposite side 14″ of Fig. 5 may be shaped similarly to the side 13″ facing the room, in the same manner. However, the opposite side 14′ of Fig. 4 is angular, rather than curved, for ease in forming, and also to provide a large bearing surface for plaster 17, or the like, for reasons pointed out below.

For attaching the device D to the walls and ceiling of a room, either the side facing the room, as in Figs. 3 and 4, or the opposite side, as in Fig. 5, extends beyond the other side to form flanges 18, thereby providing means for attaching the sections to the walls and ceiling. Flanges 18 are provided with holes through which screws 19, or the like, extend into sleepers, rafters, studding, or the like. As used herein, the walls and ceiling of a room refer to the entire wall structure, or any component part thereof. When installing the sections in a room being built, the flanges 18 are preferably flush with plaster 17, as in Figs. 3 and 5, but the sections may be installed in a room already built and directly on the plaster, as in Fig. 4. As indicated previously, the shape of side 14′ provides a relatively large bearing area to prevent damage to the plaster.

The temperature of the surface of the side facing the room need not be high, about 120° F. to 130° F. being usually sufficient. This temperature may readily be obtained by passing hot water through the heating device. As in Fig. 1, the hot water is supplied through pipes 20, the water circulating through the heat device and returning by pipes 21 to a furnace, boiler, or the like. In case heat devices of upper floors are also to be supplied, the device may be supplied by a take-off from a riser 22, as in Fig. 3, which extends upwardly to the next floor or floors. A similar riser is provided for return of water. The sides 14, 14′ and 14″ are provided with suitable threaded openings for connection of the piping. Preferably, these openings are located adjacent the lower corners of the heating device, so that hot water enters at one end, flows along between the sides, and then is discharged at the opposite lower corner.

In lieu of hot water or steam, electricity may be supplied as the heating medium, as in Fig. 5. The sides and ends of the device of Fig. 5 form an enclosure, as before, but the enclosure is preferably filled with a liquid, such as water, up to a filling plug 23, an air space 24 being left above the water to prevent overstress of the unit due to expansion and contraction. The water is heated by electricity supplied to an immersion heating unit 25 through wires installed within a conduit 26. One or more heating units may be utilized within each heating section, as desired, a suitable immersion unit being the "Calrod" resistance heater. The rear or opposite side may be covered by a layer of insulating material 27, to insure that all of the heat supplied by the electrical heating unit will be converted into radiant heat and directed into the room.

Among the advantages of the device utilizing electricity as the heating medium, are the ease with which it may be installed, the accuracy of control of the temperature of different rooms, by which a considerably greater or lesser amount of radiant heat may be discharged into any desired room, depending upon the number of occupants and the heat loss to be compensated. In addition, the initial cost of the installation is considerably less because no furnace, chimney, or piping through the house are required. Also, no heated air is removed for combustion purposes in the furnace, nor is the dust usually produced by a coal furnace present. The electrical device is particularly advantageous where low cost electricity may be obtained.

It will be understood, of course, that the heat devices of this invention are not intended to operate in the same manner as usual hot water or steam radiators, since the latter depend principally upon a flow of air over their surfaces to carry heat to the other parts of the room. To the contrary, the heating devices D are preferably constructed and formed of suitable material, so that the radiation output thereof is a maximum, and the contents of the room, rather than air in the room, are heated by radiant heat directed from the surfaces of the device toward all parts of the room. Preferably, at least the side of the heat device forming the radiating surface is composed of material which does not tend to corrode and which is easily cleaned, and thus will remain clean and bright during use, such as stainless steel, stainless-clad steel, aluminum, or the like. Also, particularly when hot water or steam is supplied thereto as the heating medium, the heat devices preferably form a portion of a closed circuit to which no air is admitted, to prevent the collection of air in the devices D and the corrosion which usually results therefrom.

In further accordance with this invention, and depending upon the size of the room, one or more heat devices, or sections thereof, are installed along each wall of the room. As in Fig. 2, each corner of the room is occupied by a dummy section 28, having intersecting surfaces with the same configuration as the sides 13 of adjoining heating sections. The heating sections are preferably made in standard lengths, such as 4 ft., 6 ft., and 8 ft., and any space in the corner left by the standard sections or combinations thereof, is filled by a dummy section 28. This reduces installation costs to a minimum, since the dummy section 28 has only one thickness and may be readily cut to any length, thereby eliminating any cutting or alteration of a double-walled heating section.

The heat devices need not extend all the way around a room, though such is preferable. Also, if a projection, as caused by a chimney or the like, extends into the room, the device may extend to one side of the projection, then continue again on the opposite side. If the projection occurs so as to leave a gap between it and the end of a standard section, a dummy sheet, similar to the dummy corner section 28 may be installed to bridge the gap without requiring a standard section to be cut or altered in any way. Also, dummy sections can be installed to reduce the total heating area, particularly in rooms where the heating capacity of standard sections extending all the way around the room is not needed.

In still further accordance with this invention, the radiant heat device may be constructed so as to direct not only radiant heat, but also light, into the room. As illustrated in Fig. 4, the side 13' facing the room may be provided with a hollow, semi-cylindrical light receiver 29 formed by an extension of the lower attaching flange 13. Receiver 29 is so positioned that a lighting unit 30, preferably an elongated tubular gas filled unit or the like, may be mounted on supports 31 to produce light which is reflected into the room from the same surface from which radiant heat is directed into the room, as shown by the light ray indicating lines of Fig. 4. As will be evident, the major portion of the light is preferably reflected from the surface of side 13' toward the ceiling or upper portion of the room, to provide an indirect lighting effect. Such indirect lighting effect tends to distribute the light more uniformly through the room, which lessens eye strain and adds to the beauty and appearance of the room furnishings and decorations.

Another embodiment of this invention, constituting a radiant heat device D', is illustrated in Figs. 6 to 8, inclusive. Device D' comprises one or more sections, each having a side 35 facing the room, an opposite side 36, and ends 37 attached together, as in the previous embodiment, one of the sides providing flanges 18 as means for attaching the device to the wall and ceiling of the room. Side 35 is relatively flat, but is inclined or disposed angularly with respect to the wall 10 and ceiling 11 of the room R. Side 35 is provided with a plurality of curved indentations 38, which are arcuate shaped about axes extending laterally of side 35 and tend to distribute the heat more effectively about the room. Thus, radiant heat rays will be received by an occupant not only along lines at right angles to the surface of side 35, but also from indentations spaced along the side. As before, connections may be provided for receiving hot water from pipes 20, as in Fig. 7, and dummy corners 39 are provided to facilitate installation in rooms whose dimensions may differ.

When the heating device is installed on a wall which is solid, such as an exterior brick wall through which it is extremely inconvenient or impossible to run piping, as in Figs. 6 and 8, an inlet pipe 40 may extend through an adjacent partition, and connect with the heating unit at a point in end 37. From one section, the water may then pass through upper and lower connecting pipes 41 to the next section, and then be removed through a discharge pipe 42 which similarly extends to a wall or partition through which such a pipe may be more readily run. Preferably, such inlet and outlet pipes are concealed by the dummy corners 39.

It will be understood, of course, that similar inlet, connecting, and discharge pipes may be provided for the device D of the first embodiment, and that any of the previous constructions may be provided with indentations, or the like, in the same manner as device D'. Also, any of the previous constructions may be supplied with hot air or steam at the heating medium. Steam so supplied will usually be low pressure steam, or a sufficient pressure below atmospheric will be maintained in the heating system to reduce the temperature of saturated steam to considerably below that at atmospheric pressure. When hot air is supplied the radiant heat device, connections similar to those of devices D'' of Figs. 9 and 10, may be provided.

Devices D'' are constructed to simulate ceiling beams and are particularly adapted to receive hot air as the heating medium. Each simulated beam has sloping sides 45 for distributing the radiant heat rays more evenly about the room. As will be evident from Fig. 9, the radiant heat rays from the beams are not only directed downwardly, but also to either side of the beams, and for an appreciable distance up the walls of the room. Preferably, the beams are so spaced that the radiant heat rays directed from the side of one beam will cover an area adjacent the area against which the radiant heat is directed from the bottom of the next beam. Preferably, the sides of the beams are curved so as to be convex, to distribute the radiant heat rays more uniformly about the room. The simulated beams may be sufficiently strong to sustain the load on normal beams, preferably being formed of metal, and thereby being sufficiently strong to carry the load normally imposed on a wooden beam of somewhat the same dimensions.

Figure 10:
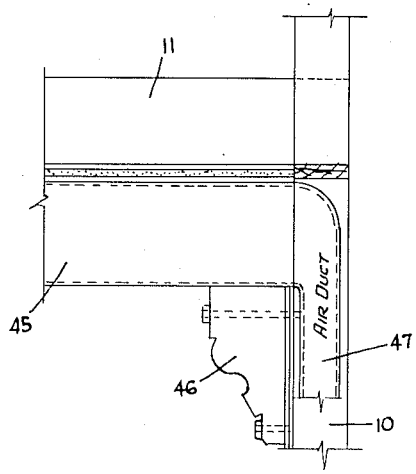
Fig. 10 is an enlarged partial longitudinal vertical section of the installation of a heat device of Fig. 9.

The beams are supported at the ends by caps 46, as in Fig. 10, and hot air is supplied to each beam by a duct 47, a similar duct at the opposite end of the bam removing the air after passage through the beam. Preferably, when hot air is utilized as the heating medium, the beams form a portion of a closed circuit, the air being merely used to carry heat from a furnace or the like to the beams.

When an installation of radiant heat devices constructed in accordance with this invention is made in connection with an older or existing hot air or hot water furnace, a suitable pump or blower is preferably installed to convert the system into a forced, rather than a gravity system. This not only increases the amount of water or air that can be circulated, but also provides more accurate control over the heating effect of the system.

Figure 11:
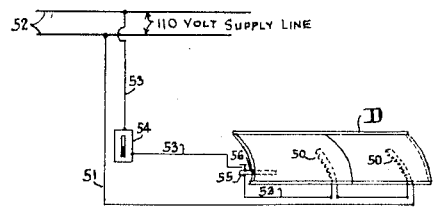
Fig. 11 is a diagram of an electrical control circuit, particularly useful when electricity is supplied as the heating medium.

For controlling the amount of radiant heat supplied, individual controls for each room may be utilized, or a single control for a number of rooms. Fortuitously, the amount of radiant heat necessary to be supplied for comfort of the occupants will vary inversely in accordance with the temperature of the room. Thus, the lower the room temperature, the greater the heat loss of the occupants, and the greater amount of radiant heat to be supplied. The radiating surfaces of the radiant heat devices may be maintained between predetermined temperature limits, and preferably below a maximum upper limit, and heat may be supplied only when the room temperature is below a predetermined limit. A suitable circuit for controlling one or more heat devices D supplied with electricity as the heating medium and in a single room is illustrated in Fig. 11.

Electricity is supplied the heating coils 50 of one or more immersion units of the type previously described, the sections of devices D preferably being filled to a predetermined level with a liquid such as water, as described in connection with Fig. 5. Coils 50, which are illustrated as connected in series, are connected at one side by a wire 51 with one wire of leads 52, which may supply usual household curent, such as 110 volts A. C. The other lead wire is connected to the other side of coils 50 by wires 53 through a thermostatic switch 54, and contacts 55 adapted to be opened and closed by a bi-metallic strip 56. Thermostatic switch 54 is responsive to the temperature in the room, and will close the circuit when a predetermined lower temperature is reached. Bi-metallic strip 56 extends into the device D and is responsive to the temperature of the water therein. When the temperature of water in the device reaches a predetermined maximum, corresponding to the temperature of the radiating surface, strip 56, which is fixed at one end, will open contacts 55, one of which is carried by the opposite end of the strip. As long as the radiant heat device is at or above the maximum temperature, no additional heating medium will be supplied, but as long as the temperature remains below the upper limit, contacts 55 will remain closed, and the heating medium will be supplied as long as called for by thermostatic switch 54. A similar circuit may be utilized in controlling the supply of steam, hot water, or hot air to radiant heat devices D, D', or D'', by substituting an oil burner pump motor, coal stoker motor or/and blower motor, for coils 50. It will be understood, of course, that other circuit arrangements may be utilized.

The above radiant heat devices are each described as utilized for heating, rather than cooling purposes. However, merely by circulating cold water or cold air through the devices, the same can be used for cooling purposes. Such devices will cool in part by absorbing heat radiated from the occupants of the room, and also in part by convection, since the cooled air about the devices will tend to drop to the lower portion of the room to be replaced by warmer air which is, in turn, cooled. It will be noted that convection currents, which are to be avoided in heating, are present when cooling by the device of this invention. However, air curents during summer periods are desirable, inasmuch as they effect a cooling sensation by permitting faster evaporation of skin moisture, which produces a cooling sensation.

From the foregoing, it will be evident that the heat device and method of this invention fulfill the objects hereinbefore specified, and that substantially any type of room or construction can be accommodated, i. e., either a small or large room, and either new or remodeled construction. As will also be evident, a result of use of the heat devices D and D' is that all upper corners of a room are hidden, so that plaster cracks, which usually occur in the corners, are not seen when installation is made in a room already constructed, or plaster in the upper corners is eliminated in new construction. In the latter case, further economy in construction cost is obtained by elimination of such plaster.

Heat devices constructed in accordance with this invention are economical, since the total area of radiating surface may be less than convection and conduction radiators, due to the more effective utilization of heat. As will be evident, each of the embodiments and forms thereof is relatively easy to maintain clean, since there are no crevices tending to collect dust, as in the case of prior radiators of usual construction. Also, the heat devices of this invention are more pleasing to the eye than prior radiators of usual construction, and will appear to many, to improve the appearance of the room.

It will be understood that numerous changes and modifications may be made. For instance, any of the embodiments, or the forms thereof, may be constructed to be supplied with any desired type of heating medium, such as by an electric immersion heater. Also, any of the other embodiments or forms thereof, may be provided with features or other forms or embodiments, such as a shielded light source, transverse curved indentations, end connections for the heating medium hidden by dummy sections, and the like. Also, curved and other shapes of radiating surfaces and/or sides of the heat devices other than those shown may be utilized.

Although different embodiments of this invention, and various alternative constructions thereof, have been illustrated and described, it will be understood that all embody a basic concept of heating by a radiant heat device installed near the ceiling of a room and having a configuration tending to distribute radiant heat rays substantially uniformly over the room. It will also be understood that modifications other than those described may exist, such as a device installed in a recess in a wall or ceiling of a room. It will further be understood that various changes other than those indicated may be made in both the method and devices of this invention without departing from the spirit and scope thereof.

What is claimed is:

1. A radiant heat device for positioning along the upper portion of a room adjacent the intersection of walls and ceiling comprising a back plate having flanges formed on terminal edges thereof for engaging said walls and ceiling, a radiating plate disposed outwardly from and in spaced relation with said back plate, walls joining the terminal edges of said back and radiating plates defining a liquid and pressure tight container, and means for introducing heated media into said container, said media being in contact with substantially the entire inner face of said radiating plate.

2. A radiant heat device for positioning along the upper portion of a room adjacent the intersection of walls and ceiling comprising a back plate having flanges formed on terminal edges thereof for engaging said walls and ceiling, an arcuate radiating plate disposed outwardly from and in spaced relation with said back plate, walls joining the ends and sides of said back and radiating plates defining a liquid and pressure tight container, and means for introducing heated media into said container, said heat controlling media being in contact with substantially the entire inner face of said radiating plate.

3. A radiant heat device for positioning along the upper portion of a room adjacent the intersection of walls and ceiling comprising an arcuate back plate having flanges formed on terminal edges thereof for engaging said walls and ceiling, an arcuate radiating plate disposed outwardly from and in spaced relation with said back plate, walls joining the ends and sides of said back and radiating plates defining a liquid and pressure tight container, and means for introducing heated media into said container, said heat controlling media being in contact with substantially the entire inner face of said radiating plate.

4. A radiant heat device for positioning along the upper portion of a room adjacent the intersection of walls and ceiling comprising a back plate having flanges formed on terminal edges thereof for engaging said walls and ceiling, a concave radiating plate disposed outwardly from and in spaced relation with said back plate, walls joining the ends and sides of said back and radiating plates defining a liquid and pressure tight container, and means for introducing heated media into said container, said heat controlling media being in contact with substantially the entire inner face of said radiating plate.

5. A radiant heat device for positioning along the upper portion of a room adjacent the intersection of walls and ceiling comprising a convex back plate having flanges formed on terminal edges thereof for engaging said walls and ceiling, a convex radiating plate disposed outwardly from and in spaced relation with said back plate, walls joining the ends and sides of said back and radiating plates defining a liquid and pressure tight container, and means for introducing heated media into said container, said heat controlling media being in contact with substantially the entire inner face of said radiating plate.

6. A radiant heat device for positioning along the upper portion of a room adjacent the intersection of walls and ceiling comprising a back plate having flanges formed on terminal edges thereof for engagement with said walls and ceiling, a radiating plate disposed outwardly from and in spaced relation with said back plate for directing radiation throughout said room, walls joining the terminal edges of said back and radiating plates defining a liquid and pressure tight container, and connections for introducing heated media into said container such that said heated media is in contact with substantially the entire inner face of said radiating plate.

7. A radiant heat device for positioning along the upper portion of a room adjacent the intersection of walls and ceiling comprising a metal back plate having flanges formed on the terminal edges thereof for engagement with said walls and ceiling, a radiating plate of clean and bright polished metal disposed outwardly from and in spaced relation with said back plate, walls joining the terminal edges of said back and radiating plates defining a liquid and pressure tight container, and threaded connections in said back plate for introducing heated media into said container, said heated media being in contact with substantially the entire inner face of said radiating plate.

8. A plurality of radiant heat devices for positioning along the upper portion of a room adjacent the inter-section of walls and ceiling comprising back plates having flanges formed on the terminal edges thereof for engaging said walls and ceiling, radiating plates disposed outwardly from and in spaced relation with said back plates, walls joining the terminal edges of said back and radiating plates defining liquid and pressure tight containers, connections for introducing heated media into said containers, means interconnecting said connections to distribute the heated media throughout said devices, and a plurality of sections of shape corresponding to the exposed faces of said devices for inter-connecting said devices when placed around the walls of the room, said heated media in each said enclosures being in contact with substantially the entire inner face of the enclosing radiating plate.

9. A radiant heat device for positioning along the upper portion of a room adjacent the intersection of walls and ceiling comprising a back plate engaging said walls and ceiling, a radiating plate disposed outwardly from and in spaced relation with said back plate, walls joining the terminal edges of said back and radiating plates defining a liquid and pressure tight container, and an electrical immersion heater for controlling the heat of media introduced into said container, said media being in contact with substantially the entire inner face of said radiating plate.

10. A radiant heat device for positioning along the upper portion of a room adjacent the intersection of walls and ceiling comprising a back plate having flanges on the terminal edges thereof for engaging said walls and ceiling, a radiating plate disposed outwardly from and in spaced relation with said back plate, walls joining the terminal edges of said back and radiating plates defining a liquid and pressure tight container, means for introducing heated media into said enclosure so that the heated media will be in contact with substantially the entire inner face of said radiating plate, and a light source receiving section extending longitudinally beneath said radiating plate.

11. A radiant heat device for positioning along the upper portion of a room adjacent the intersection of walls and ceiling comprising a back plate having flanges on the terminal edges thereof for engaging said walls and ceiling, a radiating plate disposed outwardly from and in spaced relation with said back plate, walls joining the terminal edges of said back and radiating plates defining a liquid and pressure tight container, means for introducing heated media into said enclosure so that the heated media will be in contact with substantially the entire inner face of said radiating plate, and a semi-cylindrical light source receiving section extending longitudinally beneath said radiating plate.

FREDERICK W. RIEHL.

REFERENCES CITED

The following references are of record in the file of this patent:

UNITED STATES PATENTS

| Number | Name | Date |
| --- | --- | --- |
| 1,174,714 | Harrison | Mar. 7, 1916 |
| 1,365,807 | Weber | Jan. 18, 1921 |
| 1,671,568 | Barker | May 29, 1923 |
| 2,382,340 | Smith | Aug. 14, 1945 |

FOREIGN PATENTS

| Number | Country | Date |
| --- | --- | --- |
| 238,024 | Great Britain | Aug. 13, 1925 |
| 366,770 | Great Britain | Feb. 11, 1932 |
| 369,780 | Great Britain | Mar. 31, 1932 |
| 875,412 | France | June 22, 1942 |